Patented Sept. 16, 1924.

1,509,084

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF CHURNING CREAM.

No Drawing.   Application filed December 21, 1922.   Serial No. 608,336.

*To all whom it may concern:*

Be it known that I, CHARLES E. NORTH, a citizen of the United States of America, residing at Montclair, in the county of Essex and State of New Jersey, have invented certain new and useful Improvements in Processes of Churning Cream, of which the following is a full, clear, and exact description.

In the process of making butter by the churning of milk or cream the primary object is to so agitate the fat globules that by the impact of the blow which brings them into contact with each other they will stick together or agglomerate into masses which may be readily collected and separated out from the milk or cream as butter.

Several factors contribute greatly to the success of this operation, and for a more complete understanding of the invention herein set forth they may be considered. The temperature of the milk or cream, and hence of the fat globules in the churning process, must be so controlled that the physical condition of the fat imparts to its particles a consistency suitable for adherence or sticking together when brought in contact, and such contact results from the blows of the dashers or paddles of the churn. If the globules be too soft or in a melted condition, no agglomeration occurs, but the agitation of churning merely results in breaking up the droplets of liquid oil into still finer particles and distributing these through the milk serum. If the fat globules be too hard or solidified by chilling so that they become strongly crystallized, then their surfaces are not sufficiently sticky and agitation fails to bring about their agglomeration. If, however, the temperature be such that the fat globules are in a simi-fluid or waxy condition, then their surfaces are sticky and when one globule is driven against another, adherence takes place and the collection of globules into masses is facilitated by the churning.

Another factor which exerts a great influence is the consistency of the serum or fluid portion of the milk or cream in which the fat globules are suspended. The permanence of milk in the form of an emulsion is due to the presence of a colloid or jelly-like substance which thickens the liquid enveloping the fat globules. The friction of the globules against this thickener and the coating of every globule by this colloid composing the thickener, interferes with the freedom of motion of the globules and with their contact with each other. In churning, therefore, the presence of casein, albumen, and other milk solids in the liquid is an impediment to the agglomeration or adherence of the fat globules which the process of churning is intended to bring about. The removal or amelioration of this impediment would obviously facilitate the process of producing butter.

The existing knowledge of the art would manifestly suggest dilution of the milk or cream as the simplest way of overcoming this obstacle, as this would reduce the thickness of the colloid surrounding the fat globules. For example if an equal volume of water were added to the milk or cream, the thickness of the solids other than the fat would be reduced roughly 50 per cent. With larger dilutions of water this thickness would be reduced by correspondingly larger percentage. But such dilution is objectionable for the reason that it greatly increases the volume of the milk or cream and reduces correspondingly the percentage of fat, and the globules become much less numerous in proportion to the volume of liquid and their contact with each other is less frequent under the agitation of the churn because they are more scattered in the larger volume of liquid.

I have found, however, that dilution of the milk serum and other milk solids with water may be accomplished without reducing the concentration of the fat by the following method.

Fresh sweet cream is first obtained by passing the whole milk through an ordinary centrifugal cream separator. For instance, 10 cans of milk having a fat percentage of 4 per cent may be passed through the separator and yield one can of cream containing 40 per cent of fat and 9 cans of skim milk containing practically no fat. Before churning this cream to produce butter I add to the cream 9 cans of water, producing a volume of liquid equal to that of the original whole milk. This mixture, at a proper temperature of approximately 100° F., is then passed through the cream separator in the same way as the original milk, with the result that there is obtained one can of washed cream containing 40 per cent fat, and 9 cans of water mixed with the skim milk remaining in the cream.

A chemical examination will then show that the first cream obtained from the whole milk consisted of 40 per cent fat and 60 per cent skim milk, the latter containing solids not fat amounting to slightly more than 5 per cent of the whole. After the dilution and washing, however, the can of cream will be found to contain 40 per cent fat and 60 per cent of the water diluted skim milk in which the solids not fat amount to only one-tenth of the former amount, or 0.5 per cent.

If now the washing process be repeated by adding 9 cans of water to the one can of washed cream, and the mixture again passed through the cream separator, there will result one can of cream which has been doubly washed, and which will still contain 40 per cent fat and 60 per cent of water in which the solids not fat are one-tenth of the amount in cream after the first washing, or 1/100th, or 1 per cent of the amount in the original cream. In other words, the percentage of solids not fat will be .05 per cent.

In this way there will be available for churning a washed cream in which the solids not fat which enter into the envelopes surrounding the fat globules, will be only 1 per cent of those in the original natural cream. There will therefore be only 1 per cent of the interference which is caused by the friction of this material with the fat globules and which is due to the envelopes of this material around each globule. The removal of 99 per cent of the colloid or gummy casein, albumen and other milk solids from the milk serum surrounding the fat globules greatly facilitates the churning, as the fat concentration is not at all reduced, while the other milk solids have been practically eliminated.

Cream thus treated has a tendency toward the spontaneous separation of fat globules from the milk serum, and if allowed to stand in a cold temperature the fat globules will rise in the course of two or three hours to the surface in a mass which is much thicker than the fatty layer found in unwashed cream. This fat layer which rises to the surface resembles very closely in appearance the mass of fat observable in ordinary churning immediately after the breaking point, which is the stage in churning when fat agglomeration is almost complete.

If the washed cream, above described, be put in an ordinary churn, such as a barrel churn, it will be found that at the ordinary rate of revolution of the churn, the time required for the complete butter-making process will be one-tenth or less of the time required to churn such cream in an unwashed condition. For example, if the churning of unwashed cream requires 50 minutes, it will be found that in the same churn the same cream after two washings, as above set forth, can be churned in less than five minutes.

The advantage of this improvement is obvious. The dilution and washing of the cream involves no manual labor, very little time, and practically no expense, and if the time of churning can be and is reduced as indicated, the capacity of any given butter making establishment will be, by the use of this process, enormously increased.

I am aware that cream has been diluted with water for the purpose of washing it. I am aware of the use of water in the churn to facilitate the breaking of butter, but both of these dilutions enlarges the volume of fluid and decreases the concentration of the fat in the cream. The dilution of the cream with water while maintaining the concentration of the fat at the same percentage and thereby decreasing the time required in churning is, I believe, distinctly new.

What I claim is—

1. The process of churning hereinbefore set forth, which consists in diluting the cream with water and then passing the mixture through a cream separator to obtain a washed cream, and then churning the washed cream.

2. The process of churning hereinbefore set forth, which consists in diluting the cream with water and then passing the mixture through a cream separator, then repeating the dilution and separation and churning the doubly washed cream.

3. The process of churning hereinbefore set forth, which consists in passing whole milk through a cream separator, diluting the resulting cream with a volume of water substantially equal to the skim milk separated, passing this mixture through a cream separator to wash the cream, and then churning the washed cream.

4. The step in the process of churning cream for the production of butter, which consists in washing the cream to remove all of the ingredients of the milk except the fat globules, and then churning the washed cream.

In testimony whereof I hereto affix my signature.

CHARLES E. NORTH.